US009264750B2

(12) United States Patent
Mathews et al.

(10) Patent No.: US 9,264,750 B2
(45) Date of Patent: Feb. 16, 2016

(54) ADVERTISING INSERTION FOR PLAYBACK OF VIDEO STREAMS ON USER DEVICES

(75) Inventors: Robin M. Mathews, Westford, MA (US); Michael P. Ruffini, Methuen, MA (US); Tushar Saxena, Lexington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1049 days.

(21) Appl. No.: 12/977,921

(22) Filed: Dec. 23, 2010

(65) Prior Publication Data
US 2012/0167132 A1 Jun. 28, 2012

(51) Int. Cl.
| H04N 7/10 | (2006.01) |
| H04N 7/025 | (2006.01) |
| H04N 21/258 | (2011.01) |
| H04N 21/435 | (2011.01) |
| H04N 21/45 | (2011.01) |
| H04N 21/433 | (2011.01) |
| H04N 21/262 | (2011.01) |
| H04N 21/44 | (2011.01) |
| H04N 21/472 | (2011.01) |
| H04N 21/81 | (2011.01) |
| H04N 21/845 | (2011.01) |

(52) U.S. Cl.
CPC ... *H04N 21/25866* (2013.01); *H04N 21/25808* (2013.01); *H04N 21/26258* (2013.01); *H04N 21/435* (2013.01); *H04N 21/4331* (2013.01); *H04N 21/44016* (2013.01); *H04N 21/4532* (2013.01); *H04N 21/47202* (2013.01); *H04N 21/812* (2013.01); *H04N 21/8456* (2013.01)

(58) Field of Classification Search
None
See application file for complete search history.

(56) References Cited

U.S. PATENT DOCUMENTS

| 5,732,216 | A | * | 3/1998 | Logan et al. ........... 709/203 |
| 5,892,536 | A | * | 4/1999 | Logan et al. ........... 725/34 |
| 5,986,692 | A | * | 11/1999 | Logan et al. ........... 725/35 |
| 6,199,076 | B1 | * | 3/2001 | Logan et al. ........... 715/203 |
| 7,814,145 | B2 | * | 10/2010 | Lundy et al. ........... 709/203 |
| 7,975,225 | B2 | * | 7/2011 | Li et al. ........... 715/721 |
| 8,169,916 | B1 | * | 5/2012 | Pai ........... H04N 21/2181 370/236 |
| 8,185,650 | B2 | * | 5/2012 | Lau ........... H04N 21/23106 709/203 |
| 8,244,100 | B2 | * | 8/2012 | Shigetomi et al. ........... 386/249 |
| 2002/0120925 | A1 | * | 8/2002 | Logan ........... 725/9 |
| 2002/0144262 | A1 | * | 10/2002 | Plotnick et al. ........... 725/32 |
| 2003/0093790 | A1 | * | 5/2003 | Logan et al. ........... 725/38 |
| 2004/0158858 | A1 | * | 8/2004 | Paxton et al. ........... 725/42 |

(Continued)

*Primary Examiner* — Jonathan V Lewis

(57) ABSTRACT

One or more servers in an IP network receive, from a user device, a selection of live streaming content and assemble an index file including links to chunks of the selected live streaming content and links to advertising files for insertion within the selected live streaming content. The one or more severs send, to the user device, a link to the index file associated with the selected live streaming content and receive, from the user device, a streaming request for the selected live streaming content. The one or more servers send, to the user device, the index file including the links to chunks of the selected live streaming content and the links to advertising files for insertion within the selected live streaming content. The user device may use the links to combine the chunks of the selected live streaming content and the advertising files into a single linear presentation. A standards-based client for the user device is used with the server side implementation. Multiple groupings of index files, based on various location and business criteria, allow for reduction in media stream creation, and granularity of addressing each subscriber.

20 Claims, 10 Drawing Sheets

(56) References Cited

U.S. PATENT DOCUMENTS

| | | |
|---|---|---|
| 2005/0060745 A1* | 3/2005 | Riedl et al. ............... 725/42 |
| 2006/0248569 A1* | 11/2006 | Lienhart et al. ............... 725/135 |
| 2007/0055983 A1* | 3/2007 | Schiller et al. ............... 725/32 |
| 2007/0300261 A1* | 12/2007 | Barton et al. ............... 725/58 |
| 2008/0109844 A1* | 5/2008 | Baldeschwieler et al. ...... 725/35 |
| 2009/0165037 A1* | 6/2009 | Van De Pol ............ H04H 20/28 752/32 |
| 2009/0210899 A1* | 8/2009 | Lawrence-Apfelbaum et al. ............... 725/34 |
| 2009/0210900 A1* | 8/2009 | Kaftan ............... 725/34 |
| 2009/0217318 A1* | 8/2009 | VerSteeg et al. ............... 725/32 |
| 2010/0161825 A1* | 6/2010 | Ronca ............ H04N 21/23424 709/231 |
| 2010/0325658 A1* | 12/2010 | Schlack et al. ............... 725/32 |
| 2011/0093885 A1* | 4/2011 | Ravula ............... 725/32 |
| 2011/0302600 A1* | 12/2011 | Kelsen et al. ............... 725/32 |
| 2012/0096486 A1* | 4/2012 | Stallard et al. ............... 725/32 |
| 2012/0109726 A1* | 5/2012 | Ruffini ............... 705/14.4 |
| 2012/0137015 A1* | 5/2012 | Sun ............ H04N 21/26258 709/231 |

* cited by examiner

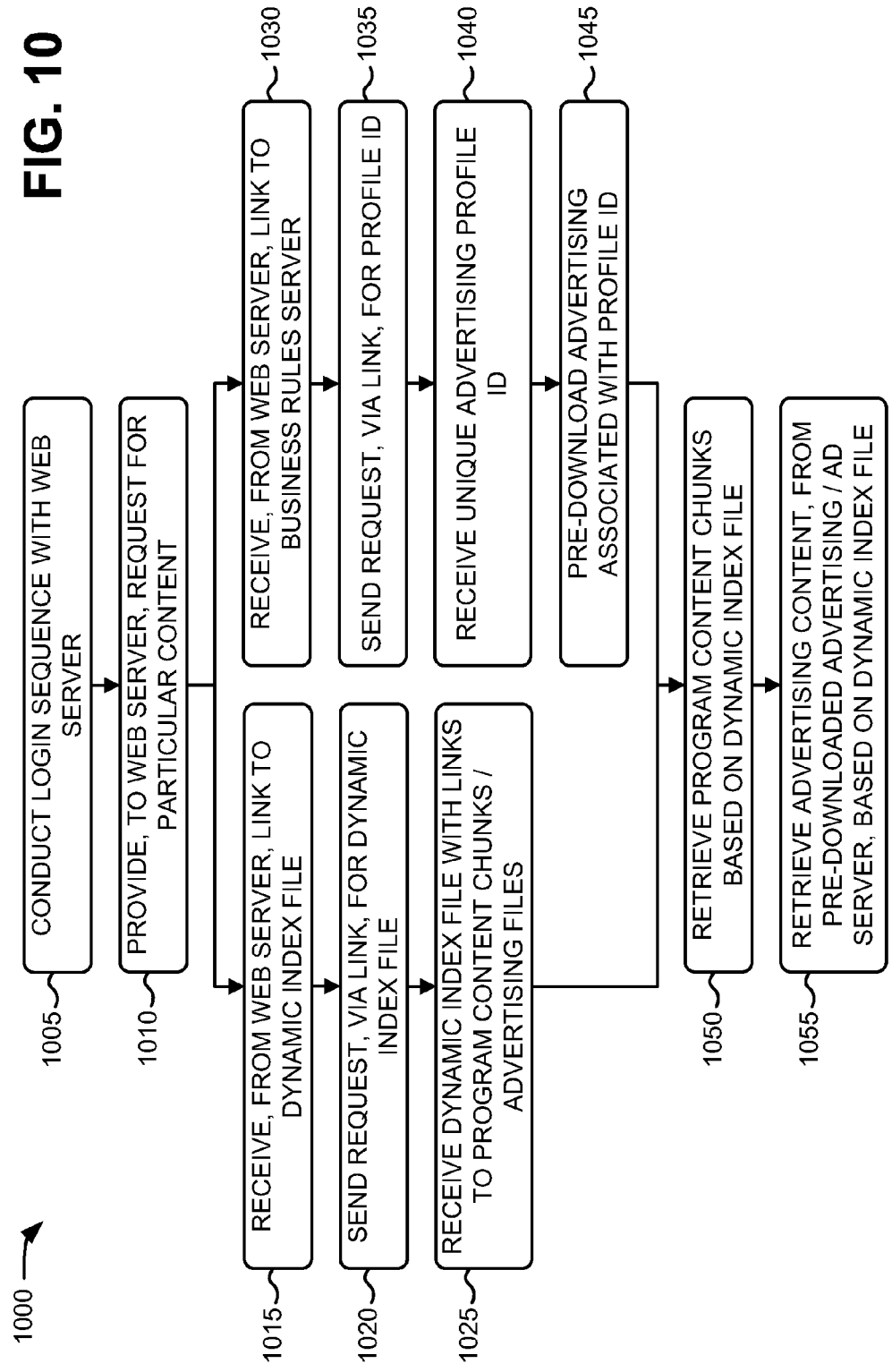

US 9,264,750 B2

ADVERTISING INSERTION FOR PLAYBACK OF VIDEO STREAMS ON USER DEVICES

BACKGROUND

Video content (e.g., television broadcasts, pay-per-view (PPV) content, video-on-demand (VOD) content, etc.) may be delivered and selected in several ways. For example, television channels may be broadcast to users. Traditionally, television broadcasts have been viewed on televisions sets, and, in many cases, using proprietary set-top boxes (STBs). More recently, users have been offered the ability to view television broadcasts on other devices, such as desktop computers, portable computers (e.g., tablet devices, laptops, etc.), and portable communication devices using standard viewing technology (e.g., commercial-off-the-shelf (COTS) applications).

Television broadcasts may include segments reserved for advertising, which is typically inserted by a service provider. It is preferred to target inserted advertising for the particular consumers viewing the television broadcasts. However, presenting targeted advertising during commercial breaks in a live television stream using COTS media players remains a challenge.

Some live television content may be subject to location-based blackouts (e.g., for sporting events that do not sell all available tickets). In traditional video delivery, such local blackouts are controlled by the content owners, through authorizations on satellite equipment. However, controlling delivery of live television content that is subject to location-based blackouts remains a challenge for other delivery formats.

BRIEF DESCRIPTION OF THE DRAWINGS

FIG. 10 is a flowchart of an example process for supplying presenting targeted advertising and/or content to a user, according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide targeted advertising and/or live content to a user device. In one implementation, server side delivery of content with target advertising is provided. Advertising links may be inserted within a file index for content in a live media stream. The advertising links correspond in time to advertising breaks in the live content and may substitute for advertising included in the live content. The advertising links may direct a user device to retrieve advertising, separate from the live media stream, that may be targeted to particular user groups. In another implementation, client side rules relating to pre-loading of advertisements are combined with server side delivery of live streaming content. Additionally, a server side mechanism provides for a way to "cue" user devices about the start of an advertisement, resulting in the user device retrieving local advertisement files based on business rules that target a certain audience.

In an example implementation, systems and/or methods described herein may receive, from a user device, a selection of live streaming content an assemble an index file including links to pieces of the selected live streaming content and links to advertising files for insertion within the selected live streaming content. The systems and/or methods may send, to the user device, a link to the index file associated with the selected live streaming content and receive, from the user device, a streaming request for the selected live streaming content. The systems and/or methods may send, to the user device, the index file including the links to the pieces of the selected live streaming content and the links to advertising files for insertion within the selected live streaming content. The user device may use the links to combine the pieces of the selected live streaming content and the advertising files into a single linear presentation.

As used herein, the term "user" is intended to be broadly interpreted to include a user device or a user of a user device.

Figure 1:
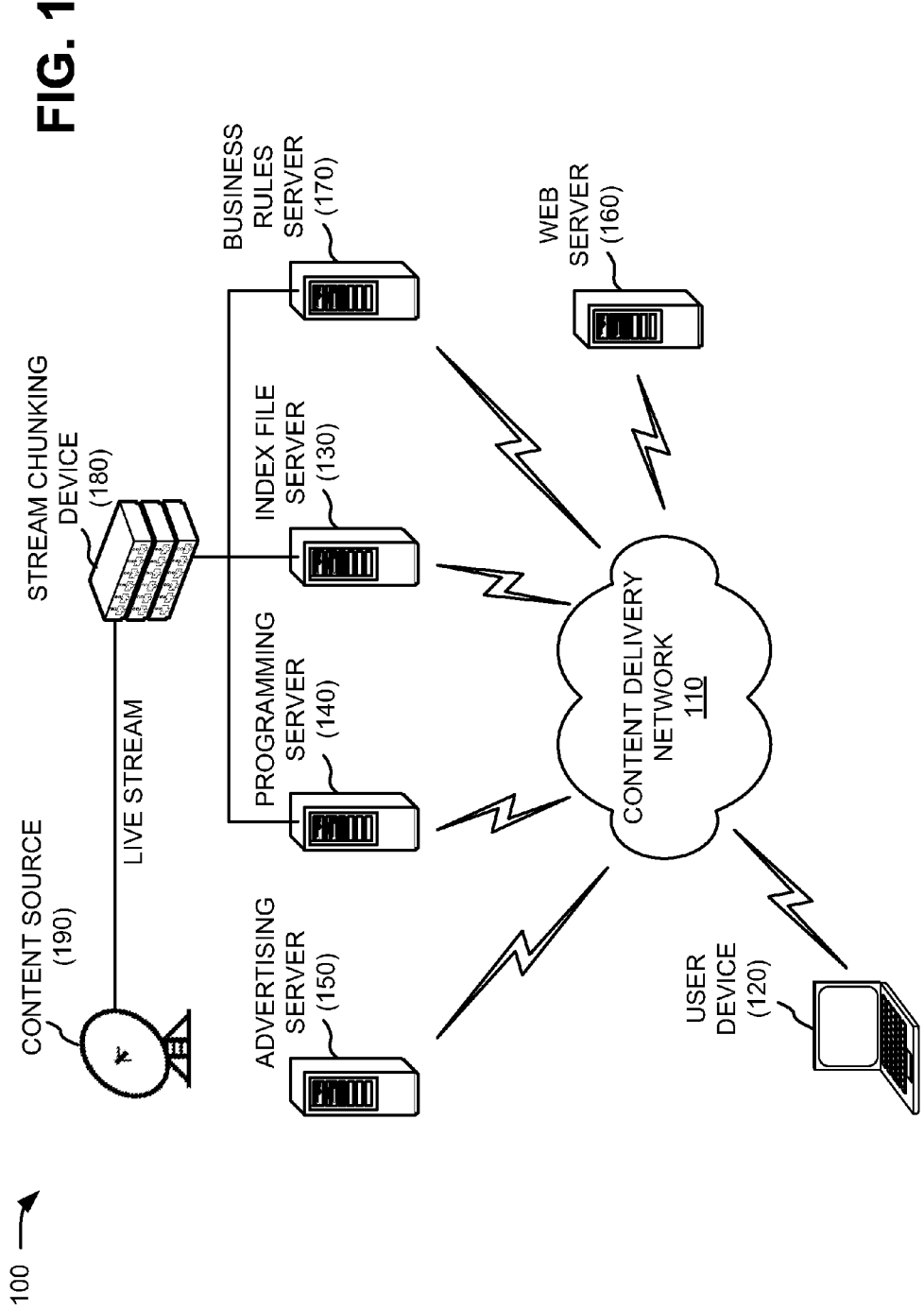
FIG. 1 is a diagram that illustrates an example network in which systems and/or methods, described herein, may be implemented.

FIG. 1 is a diagram that illustrates an example network 100 in which systems and/or methods described herein may be implemented. As shown in FIG. 1, network 100 may include a content delivery network 110, a user device 120, an index file server 130, a programming server 140, an advertising server 150, a web server 160, a business rules server 170, a stream chunking device 180, and a content source 190. Devices and/or networks of FIG. 1 may be connected via wired and/or wireless connections. A single content delivery network 110, user device 120, index file server 130, programming server 140, advertising server 150, web server 160, business rules server 170, stream chunking device 180, and content source 190 have been illustrated in FIG. 1 for simplicity. In practice, there may be more content delivery networks 110, user devices 120, index file servers 130, programming servers 140, advertising servers 150, web servers 160, business rules servers 170, stream chunking devices 180, and content sources 190. Also, in some instances, a component of network 100 may perform one or more functions described as being performed by another component or group of components of network 100.

Content delivery network 110 may generally include a local area network (LAN), a wide area network (WAN), a metropolitan area network (MAN), a wireless network, an optical fiber (or fiber optic)-based network, a cable television network, a satellite television network, or a combination of networks. Content delivery network 110 may particularly include an IP-based network. In some implementations, content delivery network 110 may be a private network controlled by, for example, a telecommunications company that provides television, telephone, and/or data access to customer premises 120. In another implementation, content delivery network 110 may be a public network, such as the Internet, or a combination of a public and private network.

User device 120 may include a radiotelephone, a personal communications system (PCS) terminal (e.g., that may combine a cellular radiotelephone with data processing and data communications capabilities), a STB, a PDA (e.g., that can include a radiotelephone, a pager, Internet/intranet access, etc.), a laptop computer, tablet or "pad" computer, a personal computer, a smartphone, or other types of computation and/or communication devices. In one implementation, user device 120 may include any device (e.g., an Internet Protocol (IP)-based device) that enables a user to access the Internet and/or communicate with index file server 130, programming server 140, advertising server 150, web server 160, and/or business rules server 170 via content delivery network 110.

In an example implementation, user device 120 may include a player (e.g., a COTS multimedia player) that plays streaming content (e.g., content that continuously plays early in a download process without requiring a complete download in order to play content). The player may be imbedded in other applications, such as a web browser or may be offered as a standalone device or application interface in a multi-purpose user device 120, such as a computer or a smartphone. The player may include software or hardware controls for playback, stop, pause, rewind, fast forward, etc. Examples of a COTS multimedia player may include Adobe™ Flash Player, Apple™ QuickTime, Windows™ Media Player, etc.

Index file server 130 may include one or more server devices, or other types of computation or communication devices, that gather, process, search, and/or provide information in a manner described herein. Index file server 130 may be associated with a provider that owns and/or manages content delivery network 110 (or a portion of content delivery network 110), index file server 130, programming server 140, advertising server 150, web server 160, business rules server 170, and/or stream chunking device 180. Index file server 130 may store index files of content, from content source 190, made available by stream chunking device 180. Each index file may be dynamic and constantly updated (e.g., as live television content continues to be received). Each entry in the index file may allow user device 120 to be directed to a particular piece of media corresponding to a live stream being delivered to user device 120. According to an implementation described herein, the index file may also contain formatted advertising uniform resource locators (referred to herein as "ad-URLs") that direct a user device to retrieve separate advertising content that corresponds in time to advertising breaks in the live stream. In another implementation, the ad-URLs may include parameters that inform user device 120 that it needs to switch to a mode where it displays advertising. The parameters in the ad-URL may also inform the client which ads need to be displayed along with information such as duration of an advertisement.

Programming server 140 may include one or more server devices that store content, such as video content, that may be delivered to user devices 120. The content may include, for example, television broadcasts, video-on-demand programming, or other video content. Programming server 140 may deliver the stored content as on-demand streaming content. In one implementation, programming server 140 may store and provide content in pieces (or chunks) that correspond to entries in index files stored in index file server 130. The television programming may be stored and made available, by programming servers 140, in real-time or near real-time relative to the original broadcast of the television programming.

Advertising server 150 may include one or more server devices, or other types of computation or communication devices, that store advertising content that may be delivered to user devices 120. The advertising content may include, for example, advertising content and metadata that allows the advertising content to be associated with particular groups, categories, and/or profiles. Advertising server 150 may provide advertising content to user device 120 upon request from user device 120.

Web server 160 may include one or more server devices, or other types of computation or communication devices, that provide (e.g., to user device 120) a video catalog application and/or performs user authentication, content listing management, or order processing. For example, web server 160 may permit user device 120 to download a program guide that may permit a user to find video content of interest or play streaming video content. Additionally, or alternatively, web server 160 may authenticate a user who desires to view, purchase, rent, or subscribe to video content. In one implementation, the interactions between web server 160 and user device 120 may be performed using the hypertext transfer protocol (HTTP) or the secure HTTP (HTTPS). In another implementation, the interactions between web server 160 and user device 120 may be performed using another type of protocol. In one implementation, web sever 160 may receive a content selection from user device 120 and may redirect user device 120 to a corresponding index file (e.g., at index file server 130) for the selected content.

Business rules server 170 may include one or more server devices, or other types of computation or communication devices, that gather, process, search, and/or provide information in a manner described herein. In one implementation, business rules server 170 may include user profile information for multiple users and/or groups of users. The user profile information may include information to associate advertising with a particular type of content based on the projected audience. For example, business rules server 170 may identify particular advertising available and/or suitable for viewers of a particular live program stream. In one implementation, business rules server 170 may communicate with stream chunking device 180 and/or index file server 130 to provide advertising information (e.g., links to particular advertising content) that may be associated with advertising breaks of an index file.

In another implementation, the use profile information may include various information regarding a user, such as location information, types of services to which the user has subscribed, a list of video content purchased by the user, a list of video content rented by the user, a list of video content to which the user has subscribed, ratings of video content by the user, a user device identifier (e.g., a media player identifier, a mobile device identifier, a set top box identifier, a personal computer identifier) for user device 142, an application identifier associated with the video content player being used on user device 120, etc. Business rules server 170 may use the profile information to associated user device 120 with one or more profiles. Business rules server 170 may assign a unique identifier to user device 120 that may correspond to the one or more profiles.

Stream chunking device 180 may include a server device, such as a computer device, and/or a network device, such as a router, that provides content chunks for delivery to user devices 120. For example, stream chunking device 180 may receive content from a content source (e.g., content source 190) may divide the content into multiple pieces (e.g., chunks). The chunks may be sent to programming server 140 to deliver to user device 120 upon request. The chunks may be divided such that the start of an advertising break in the live stream is aligned with an end of a chunk. That is, stream chunking device 180 correctly splices the live stream so the advertising breaks do not overlap with chunks of programming content so that the advertising break can be converted into an ad-URL segment. Stream chunking device 180 may also generate an index of the chunks and may provide the index to index file server 130. In one implementation, stream chunking device 180 may generate more than one index file for particular content. For example, stream chunking device 180 may generate separate index files for content that is subject to blackout restrictions (e.g., based on a geographic location).

Content source 190 may include a storage device, a satellite receiver, or another device from which multimedia content may be obtained. In one implementation, content source 190 may include a content aggregator that aggregates content, such as television programming, from a number of sources.

Techniques described herein may be used to playback video content delivered from programming server 140 and/or advertising server 150 to user device 110. The video content may be content designed (or encoded) to play on devices such as smart phones or computers. In one implementation, to playback the video content, a user may first download and install a multimedia (or video) player on user device 110. The player may then communicate with index file server 130, programming server 140, advertising server 150, and/or web server 160 to download and playback the desired video content. In one implementation, the video content may be delivered over content delivery network 110 using a packet streaming protocol, such as the known HTTP Live streaming protocol. In situations in which user device 110 connects to a telecommunications provider so that the user can receive both traditional television signals, via a dedicated connection, and IP-based data services, such as an Internet connection, the video content delivered to the player may be delivered via the IP-based packet network (also referred to as over-the-top (OTT) delivery).

In one implementation, stream chunking device 180 may generate chunks of multimedia content such that the end of certain chunks corresponds to advertising breaks (e.g., breaks in the programming sequence). The breaks may correspond to a new ad-URL that may be retrieved and presented by user device 120 during the period of the advertising break in the live stream. The new ad-URL may be included within an index file for the program content (e.g., that user device 120 retrieves from index file server 130). In one implementation, user device 120 may simply retrieve advertising content identified in the ad-URL of the index file in a manner similar to any other chunk identified in the index file. In another implementation, the ad-URL may allow user device 120 to download (e.g., from advertising server 150) advertising in a flexible manner. For example, user device 120 may pre-download advertising in advance of the advertising break, store the advertisement, and insert the downloaded advertisement at the advertising break. This mechanism may eliminate timing issues for user device 120, as stream chunking device 180 correctly splices the live stream so that the ad-break in the live stream is converted into an equivalent ad-URL.

In another implementation, web server 160 may redirect user device 120 to an index file (e.g., in index file server 130) based on the location of user device 120. For example, Web server 160 may determine if particular content requested by a user is location-restricted and, if the particular content is location-restricted, may identify a location associated with user device 120. Web server 160 may direct user device 120 to an index file for content that based on the geographic location associated with user device 120. In other implementations, location based index files may be used to supply location-specific advertising.

Although FIG. 1 shows example components of network 100, in other implementations, network 100 may include fewer components, different components, differently arranged components, or additional components than depicted in FIG. 1.

Figure 2:
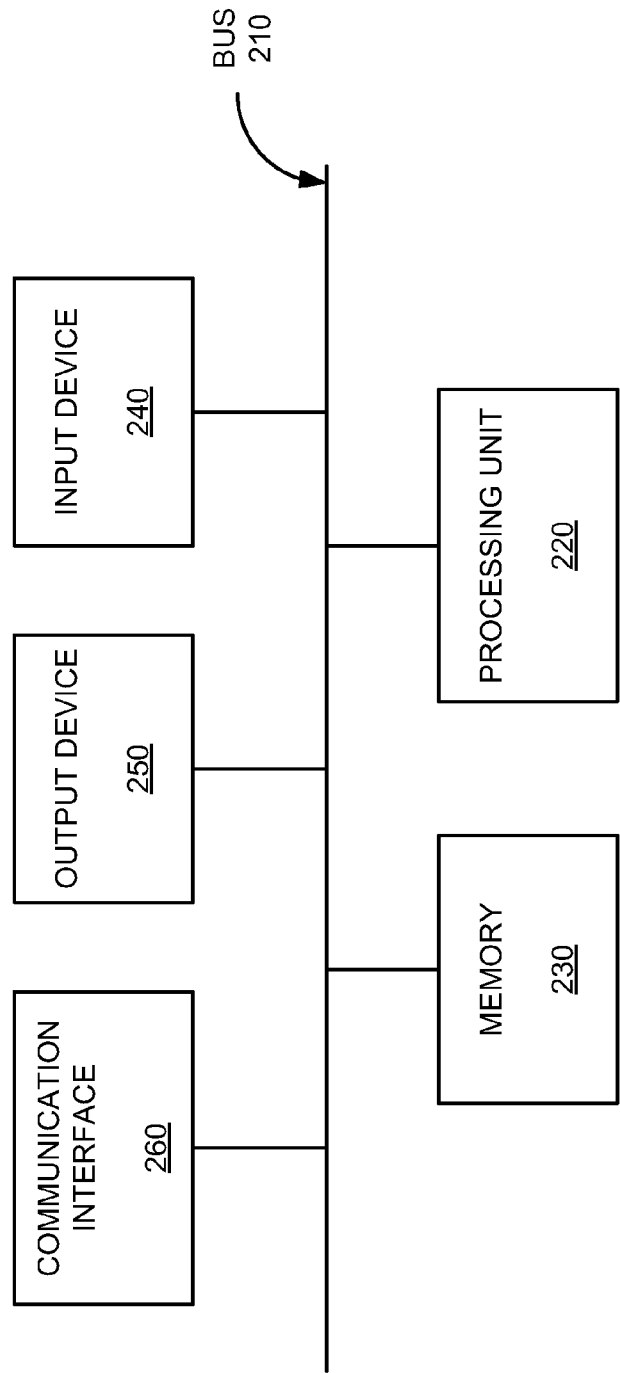
FIG. 2 is a diagram of example components of a device that may be used within the environment of FIG. 1.

FIG. 2 is a diagram of example components of a device 200. Device 200 may correspond to user device 120, index file server 130, programming server 140, advertising server 150, web server 160, business rules server 170, or stream chunking device 180. Each of user device 120, index file server 130, programming server 140, advertising server 150, web server 160, business rules server 170, and stream chunking device 180 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG.

2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
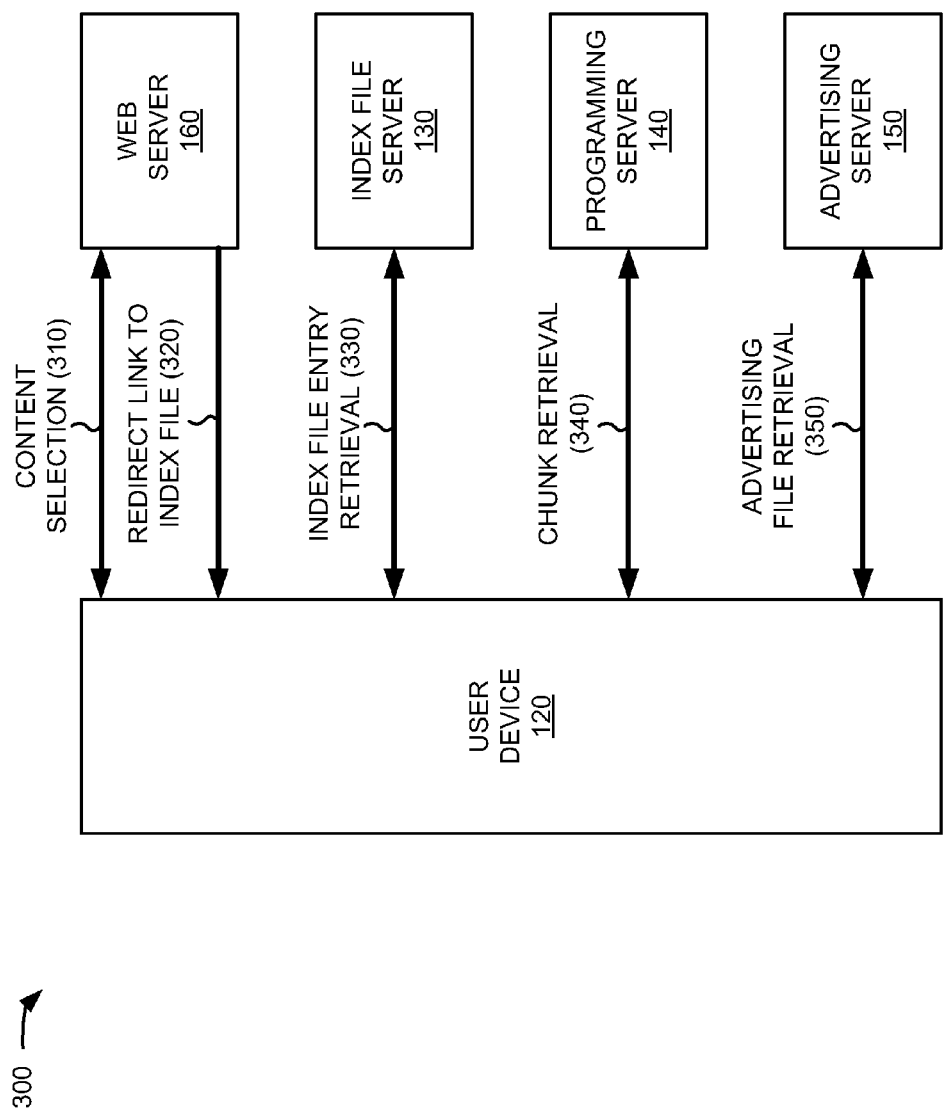
FIG. 3 is a diagram of example interactions between components of an example portion of the network depicted in FIG. 1.

FIG. 3 depicts a diagram of example interactions among components of an example portion 300 of network 100. As illustrated, example network portion 300 may include user device 120, index file server 130, programming server 140, advertising server 150, and web server 160. User device 120, index file server 130, programming server 140, advertising server 150, and web server 160 may include the features described above in connection with one or more of FIGS. 1 and 2.

As further shown in FIG. 3, user device 120 may connect to web server 160 to view available content that may be streamed to user device 120. A user (not shown) may select particular content available from web server 160. The indication of the particular content selection may be sent from user device 120 to web server 160 as content selection 310. Content selection 310 may include, for example, selection of a live television program from a program guide. Web server 160 may receive content selection 310 and may provide (e.g., using an HTTP/HTTPS connection via network 110) to user device 120 a link to redirect user device 120 to a particular index file (e.g., associated with the content selection 310), as indicated by reference number 320. The redirect link 320 to the index file may include, for example, a uniform resource locator (URL) to access the particular index files on index file server 130. User device 120 may receive redirect link 320 to the index file.

Using redirect link 320 to the index file, user device 120 may initiate a connection to obtain the index file associated with the user's selected content to initiate a streaming session. User device 120 may provide continuing requests to index file server 130 to retrieve index file entries for the selected content, as indicated by reference number 330. Index file server 130 may provide index file entries to user device 120. Each index file entry may include, for example, a URL for a particular chunk of the selected content (e.g., available on programming server 140) and/or an ad-URL to supply an advertising segment within an advertising break of the selected content (e.g., available on advertising server 150).

For each index file entry received from index file server 130, user device 120 may resolve the URL from the index file entry. Depending on the type of the file index entry (e.g., a URL for a particular chunk of the selected content or an ad-URL), user device 120 may retrieve a programming content chunk or advertising. When the file index entry includes a URL for a particular chunk of the selected content, user device 120 may retrieve a content chunk from programming server 140, as indicated by reference number 340. User device 120 may buffer (e.g., in memory 230) the content chunk and present the content chunk to the user in the appropriate sequence.

When the file index entry includes an ad-URL, user device 120 may retrieve an advertisement in accordance with the parameters of the ad-URL. For example, if the ad-URL indicates an advertising media file already stored locally (e.g., in memory 230) on user device 120, user device 120 may retrieve the local advertisement and present the advertisement to the user in the appropriate sequence (e.g., during an advertising break in the program sequence). If the ad-URL indicates an advertising media file that is not already stored locally on user device 120, user device 120 may retrieve the advertisement from advertising server 150, as indicated by reference number 350. User device 120 may store the advertisement and present the advertisement to the user in the appropriate sequence, as defined by the index file for the selected content. In another implementation, index file server 130, programming server 140, and/or advertising server 150 may be combined in a single device.

Although FIG. 3 shows example components of network portion 300, in other implementations, network portion 300 may include fewer components, different components, differently arranged components, and/or additional components than depicted in FIG. 3. Alternatively, or additionally, one or more components of network portion 300 may perform one or more other tasks described as being performed by one or more other components of network portion 300.

Figure 4:
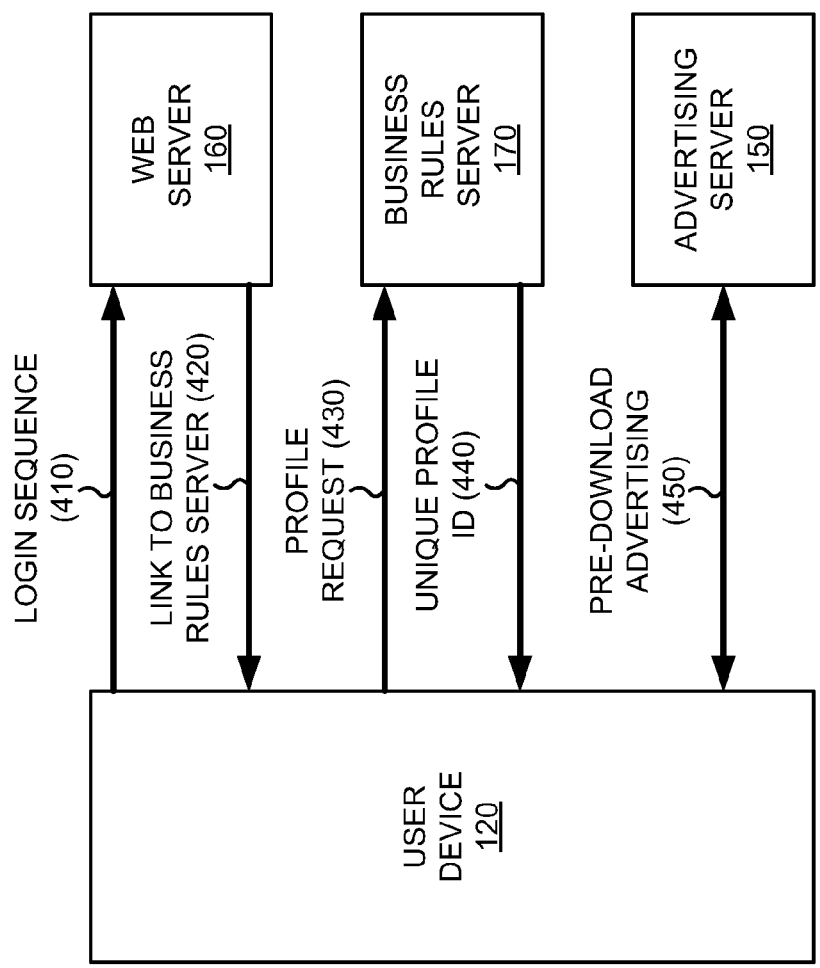
FIG. 4 is a diagram of example interactions between components of another example portion of the network depicted in FIG. 1.

FIG. 4 depicts a diagram of example interactions among components of another example portion 400 of network 100. As illustrated, example network portion 400 may include user device 120, advertising server 150, web server 160, and business rules server 170. User device 120, advertising server 150, web server 160, and business rules server 170 may include the features described above in connection with one or more of FIGS. 1-3.

As shown in FIG. 4, a user (not shown) may utilize user device 120 to initiate a connection with web server 160 (e.g., via content delivery network 110) and initiate a login sequence 410. In one implementation, login sequence 410 may be conducted as a sequence of HTTP and/or HTTPS requests and responses. Login sequence 410 may include, for example, a login sequence that includes submission, by user device 120 to web server 160, of a user name and/or password (e.g., which may be input by a user of user device 120). Web server 160 may receive the user login information, associated with the user, may provide (e.g., using an HTTP/HTTPS connection via network 110) to user device 120 a link to redirect user device 120 to business rules server 170, as indicated by reference number 420.

Using link 420 to business rules server 170, user device 120 may initiate a connection to business rules server 170 to request an advertising profile, as indicated by reference number 430. Business rules server 170 may receive profile request 430 and may associate the user device (e.g., based on an account or other login information associated with a user) with an advertising profile. Business rules server 170 may provides user device 120 with a unique profile identifier 440 that maps that user device 120 to an advertisement grouping on advertising server 150. In one implementation, unique profile identifier 440 may include a URL for the particular advertisement grouping stored on advertising server 150. Thus, user device 120 may be targeted for advertisements based on business rules.

User device 120 may receive unique profile identifier 440. Based on unique profile identifier 440, user device 120 may establish a connection with advertising server 150 and may download advertisements from the particular advertisement grouping, as indicated by reference number 450. In one implementation, user device 120 may store the downloaded advertisements for presentation based on ad-URLs included in index files (e.g., index file entries for content selected by the user).

Although FIG. 4 shows example components of network portion 400, in other implementations, network portion 400 may include fewer components, different components, differently arranged components, and/or additional components than depicted in FIG. 4. Alternatively, or additionally, one or more components of network portion 400 may perform one or more other tasks described as being performed by one or more other components of network portion 400.

Figure 5:
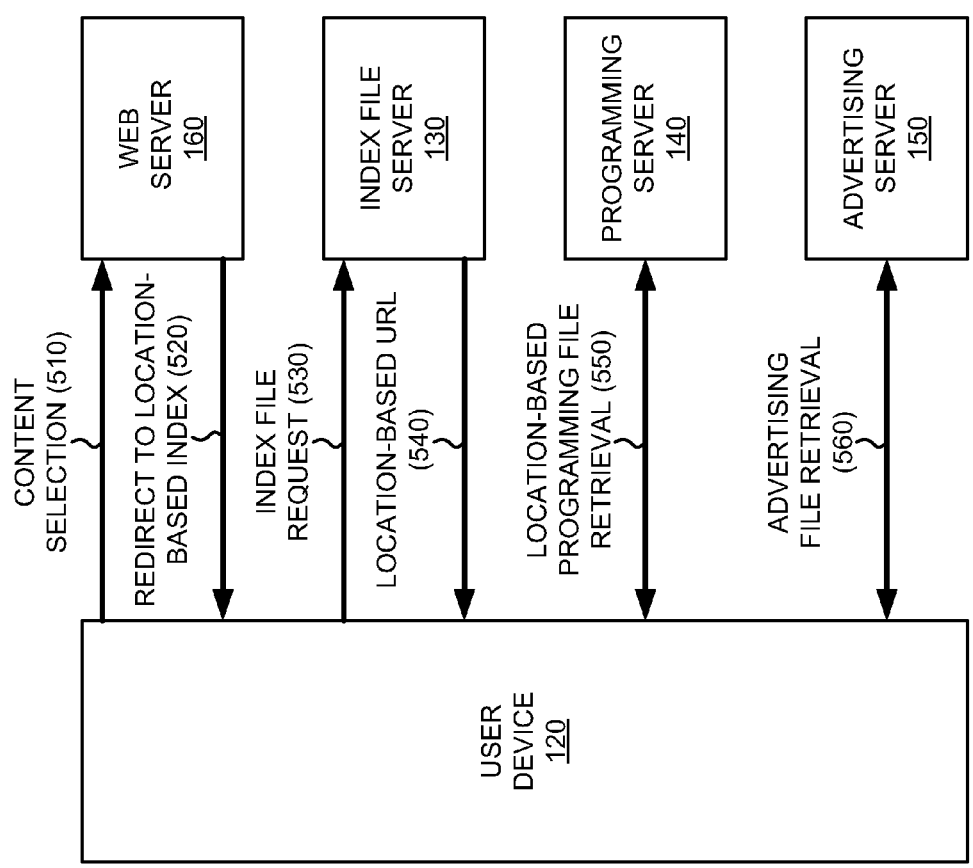
FIG. 5 is a diagram of example interactions between components of still another example portion of the network depicted in FIG. 1.

FIG. 5 depicts a diagram of example interactions among components of another example portion 500 of network 100. Interactions describe in FIG. 5 may correspond, for example, to delivery of content that is subject to location-based blackouts or location-specific advertising. As illustrated, example network portion 500 may include user device 120, index file server 130, programming server 140, advertising server 150, and web server 160. User device 120, index file server 130, programming server 140, advertising server 150, and web server 160 may include the features described above in connection with one or more of FIGS. 1-4.

As further shown in FIG. 5, user device 120 may connect to web server 160 to view available content that may be streamed to user device 120. A user (not shown) may select particular content available from web server 160. The selected content may include live content subject to location-based restrictions. For example, the selected content may include a live sporting event that is subject to blackout in a local area of the sporting event (e.g., because the sporting event did not "sell out" at the local stadium). The indication of the particular content selection may be sent from user device 120 to web server 160 as content selection 510. Web server 160 may receive content selection 510 and may determine that content selection 510 indicates content with a location-based restriction. Web server 160 may determine the location of user device 120 (e.g., based on a user's login information, a device identifier, a stored user profile, a serving base station for a wireless user device, etc.) and may provide (e.g., using an HTTP/HTTPS connection via network 110) to user device 120 a link to redirect user device 120 to a particular index file (e.g., associated with the content selection 510) based on the user location, as indicated by reference number 520. The redirect link 520 to the index file may include, for example, a URL to access a particular location-based index file on index file server 130. For example, web server 160 may redirect user device 120 to one of two index file (e.g., in index file server 130) based on the location of user device 120: a local market index file or a standard index file for the selected content. In another implementation, web server 160 may redirect user device to one of multiple index files based on an advertising region associated with a location of user device 120.

Using redirect link 520 to the index file, user device 120 may initiate a connection to obtain the location-based index file associated with the user's selected content, as indicated by reference number 530. In response, index file server 130 may send a location-based URL 540 to user device 120. For example, if user device 120 is located within a defined blackout area, location-based URL 540 may direct user device 120 to programming that identifies the event as blocked for the local market. In one implementation, the index file may also default to alternate content. If user device 120 is located outside the defined blackout area, location-based URL 540 may direct user device 120 programming server 140 to provide the selected content. Each index file entry may include, for example, a URL for a particular chunk of the selected (or alternate) content (e.g., available on programming server 140) and/or an ad-URL for an advertising segment within the selected (or alternate) content (e.g., available on advertising server 150).

For each index file entry received from index file server 130, user device 120 may resolve the URL from the index file entry. Depending on the type of the file index entry (e.g., a URL for a particular chunk of the selected content or an ad-URL), user device 120 may retrieve programming content chunks or advertising. When the file index entry includes a URL for a particular chunk of the selected content, user device 120 may retrieve a content chunk from programming server 140, as indicated by reference number 550. User device 120 may buffer (e.g., in memory 230) the content chunk and present the content chunk to the user in the appropriate sequence.

When the file index entry includes an ad-URL, user device 120 may retrieve an advertisement in accordance with the parameters of the ad-URL. For example, if the ad-URL indicates an advertising media file already stored locally on user device 120 (e.g., in memory 230), user device 120 may retrieve the local advertisement and present the content chunk to the user in the appropriate sequence. If the ad-URL indicates an advertising media file that is not already stored locally on user device 120, user device 120 may retrieve the advertisement from advertising server 150, as indicated by reference number 560. User device 120 may store the advertisement and present the advertisement to the user in the appropriate sequence, as defined by the index file for the selected content. Thus, advertising server 150 may provide local, targeted advertising for both a user's selected content and/or alternate content provided in the event of a blackout.

Although FIG. 5 shows example components of network portion 500, in other implementations, network portion 500 may include fewer components, different components, differently arranged components, and/or additional components than depicted in FIG. 5. Alternatively, or additionally, one or more components of network portion 500 may perform one or more other tasks described as being performed by one or more other components of network portion 500.

Figure 6:
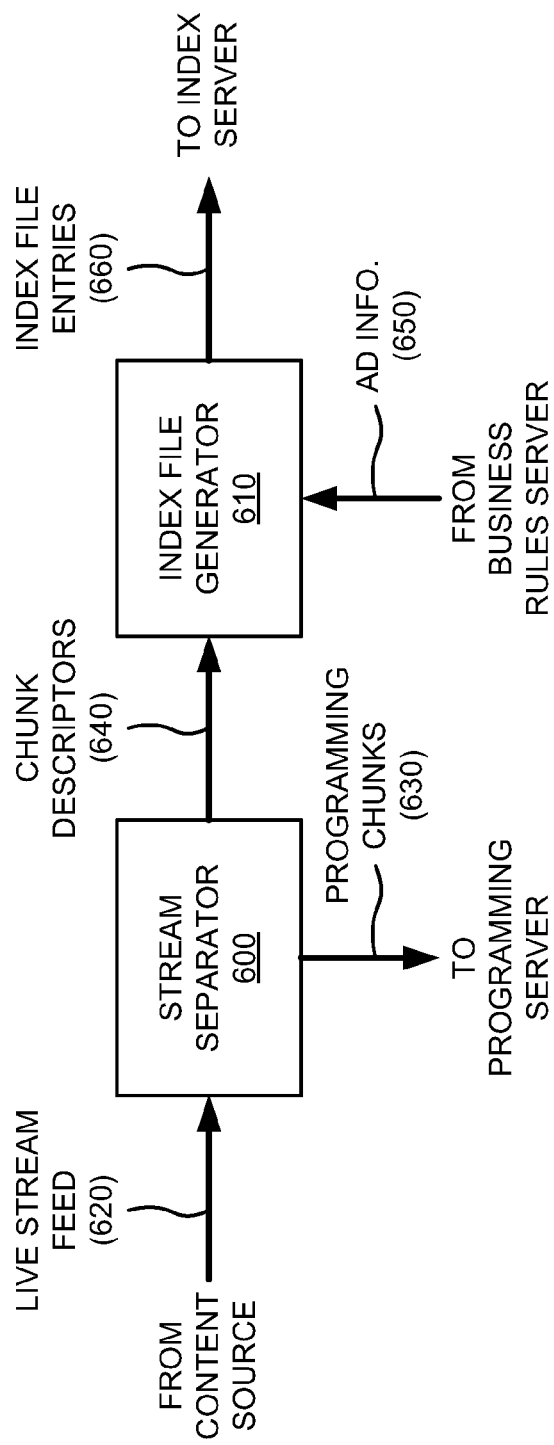
FIG. 6 is a diagram of an example functional component of the index file server of FIG. 1.

FIG. 6 is a diagram of example functional components of stream chunking device 180. In one implementation, the functions described in connection with FIG. 6 may be performed by one or more components of device 200 (FIG. 2). As shown in FIG. 6, stream chunking device 180 may include a stream separator 600 and an index file generator 610.

Stream separator 600 may include hardware or a combination of hardware and software that may divide a live program stream into small segments (or "chunks") that may be delivered to users. For example, stream separator 600 may receive a live stream feed 620 from a content source (e.g., content source 190) and divide the stream into programming chunks 630 that each contain, for example, several seconds of content from live stream feed 620. Based, for example, on advertising cue tones in live stream feed 620, stream separator 600 may create programming chunks 630 that correspond to advertising breaks in live stream feed 620. Stream separator 600 may provide programming chunks 630 to programming server 140 for retrieval by user device 120.

Stream separator 600 may generate descriptions of each chunk to allow for retrieval and sequencing of the chunks. The descriptions may also include indicators for the time-length of the chunk and whether the chunk is part of an advertising break. Stream separator 600 may provide the descriptions to index file generator 610 as chunk descriptors 640.

Index file generator 610 may include hardware or a combination of hardware and software that may combine advertising instructions with a live stream index for programming content. For example, index file generator 610 may receive chunk descriptors 640 and may assemble chunk descriptors 640 into a live stream index. Index file generator 610 may identify, based on chunk descriptors 640, advertising segments within the live programming content. Index file generator 610 may retrieve advertising information 650 (e.g., from business rules server 170) that may be used to fill advertising segments within the live programming content. Index file generator 610 may insert, into the live stream index, a formatted ad-URL(s) for one or more advertising segments. The ad-URL(s) may replace chunks associated with the advertising break in live stream feed 620. For example, in one implementation index file generator 610 may retrieve, from business rules server 170, links to particular types of advertising (e.g., based on viewer demographics or other profile information for the particular live program).

As another example, index file generator 610 may provide advertising parameters that may be used (e.g., by user device 120) to retrieve advertising content. The formatted ad-URL may include a pattern such as: targetedAd?param1@param2@param3 . . . , where param1, param2, and param3 may represent parameters for a targeted advertisement. The formatted ad-URL may notify user device 120 to switch to a mode where advertising (e.g., separate from the programming content stream) can be presented. The parameters in the ad-URL may inform user device 120 which advertisement file should be displayed, along with other information, such as duration of the advertisement. In one implementation, a parameter may instruct user device 120 to use a unique profile identifier (e.g., unique profile identifier 440) to retrieve an advertisement from a certain group of advertisements. In another implementation, a parameter may instruct user device to obtain an advertisement from a particular category of advertisements.

Index file generator 610 may provide the index chunk descriptions and the ad-URLs (e.g., to index server 130) as index file entries 660. Although index file generator 610 is shown above as a functional component of stream chunking device 180, in another implementation some or all of the functions of file index generator 610 may be performed within another device, such as index file server 130.

Although FIG. 6 shows an example functional component of stream chunking device 180, in other implementations, stream chunking device 180 may include fewer functional components, different functional components, differently arranged functional components, and/or additional functional components than depicted in FIG. 6. Alternatively, or additionally, one or more functional components of stream chunking device 180 may perform one or more other tasks described as being performed by one or more other components of stream chunking device 180.

Figure 7:
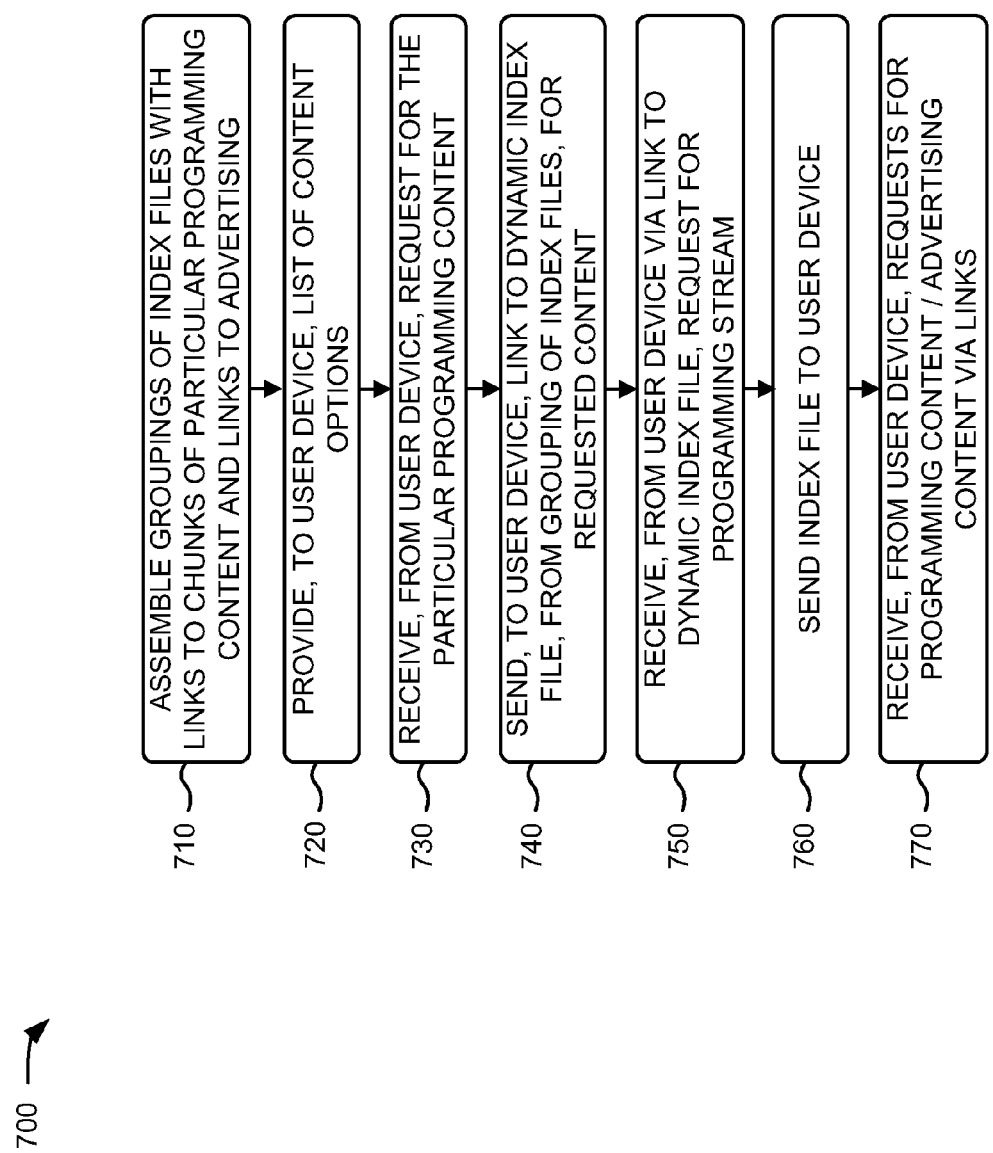
FIGS. 7 and 8 are flowcharts of an example process for providing targeted advertising and/or content to a user device, according to an implementation described herein.
Figure 8:
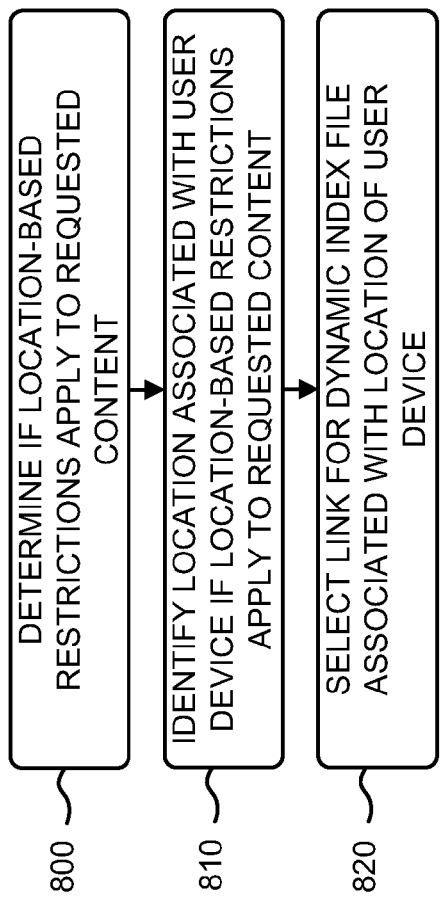

FIGS. 7 and 8 are flowcharts of an example process 700 for providing targeted advertising and/or content to a user device, according to an implementation described herein. In one implementation, process 700 may be performed by one or more components of index file server 130, programming server 140, advertising server 150, web server 160, and/or stream chunking device 180 such as one or more processing units 220. In another implementation, one or more blocks of process 700 may be performed by one or more components of other devices (e.g., business rules server 170), or a group of devices including or excluding index file server 130, programming server 140, advertising server 150, web server 160, and/or stream chunking device 180.

Process 700 may include dynamically assembling groupings of index files with links to chunks of particular live programming content and links to advertising (block 710). As described in connection with FIG. 6, stream chunking device 180 (e.g., index file generator 610) may identify advertising segments within a live stream index and may insert, into the live stream index, a formatted ad-URL for one or more advertising segments. The formatted add-URL may include, for example, links to particular types of advertising (e.g., based on viewer demographics for the particular live program) or advertising parameters that may be used (e.g., by user device 120) to retrieve advertising content (e.g., locally stored advertising content or advertising content from advertising server 150). Thus, each index file entry may include, for example, a URL for a particular chunk of the selected content (e.g., available on programming server 140) and/or an ad-URL for an advertising segment within the selected content. The groupings of index files may be based on multiple business criteria.

Process 700 may also include providing, to a user device, a list of content options (block 720), receiving, from the user device, a request for the particular programming content (block 730), and sending, to the user device, a link to the dynamic index file, from the groupings of index files, for the requested content (block 740). For example, as described above in connection with FIG. 3, user device 120 may connect to web server 160 to view available content that may be streamed to user device 120. A user may select particular content available from web server 160. The indication of the particular content selection may be sent from user device 120 to web server 160 as content selection 310. Content selection 310 may include, for example, selection of a live television program from a program guide. Web server 160 may receive content selection 310 and may provide (e.g., using an HTTP/HTTPS connection via network 110) to user device 120 a link to redirect user device 120 to a particular index file (e.g., associated with the content selection 310), as indicated by reference number 320. The redirect link 320 to the index file may include, for example, a URL to access the particular index files on index file server 130.

Referring again to FIG. 7, a request for a programming stream may be received from the user device via the link to the dynamic index file (block 750). For example, as described above in connection with FIG. 3, user device 120 may use redirect link 320 to initiate a connection to obtain the index file associated with the user's selected content. User device 120 may provide continuing requests to index file server 130 to retrieve index file entries for the selected content, as indicated by reference number 330.

The index file may be sent to the user device (block 760), and requests for programming content and/or advertising content may be received from the user device (block 770). For example, as described above in connection with FIG. 3, index file server 130 may provide index file entries to user device 120. For each index file entry received from index file server 130, user device 120 may resolve the URL from the index file entry. Depending on the type of the file index entry (e.g., a URL for a particular chunk of the selected content or an ad-URL), user device 120 may retrieve programming content chunks or advertising. When the file index entry includes a URL for a particular chunk of the selected content, user device 120 may retrieve a content chunk from programming server 140, as indicated by reference number 340. When the file index entry includes an ad-URL, user device 120 may retrieve an advertisement in accordance with the parameters of the ad-URL, as indicated by reference number 350.

Process block 740 may include the process blocks depicted in FIG. 8. As shown in FIG. 8, process block 740 may include determining if a location-based restrictions apply to the requested content (block 800), identifying a location associated with the user device, if location-based restrictions apply to the requested content (block 810), and selecting a link to a dynamic index file associated with the location of the user device (block 820). For example, as described above in connection with FIG. 5, a user of user device 120 may select content that is subject to location-based restrictions. Web server 160 may receive content selection 510 and may determine that content selection 510 indicates content with a location-based restriction. Web server 160 may determine the location of user device 120 (e.g., based on a login procedure, a device identifier, a user profile, etc.) and may provide (e.g., using an HTTP/HTTPS connection via network 110) to user device 120 a link to redirect user device 120 to a particular index file (e.g., associated with the content selection 510) based on the user location, as indicated by reference number 520. The redirect link 520 to the index file may include, for example, a URL to access a particular location-based index file on index file server 130. For example, web server 160 may redirect user device 120 to one of two index files (e.g., in index file server 130) based on the location of user device 120: a local market index file or a standard index file for the selected content.

Figure 9:
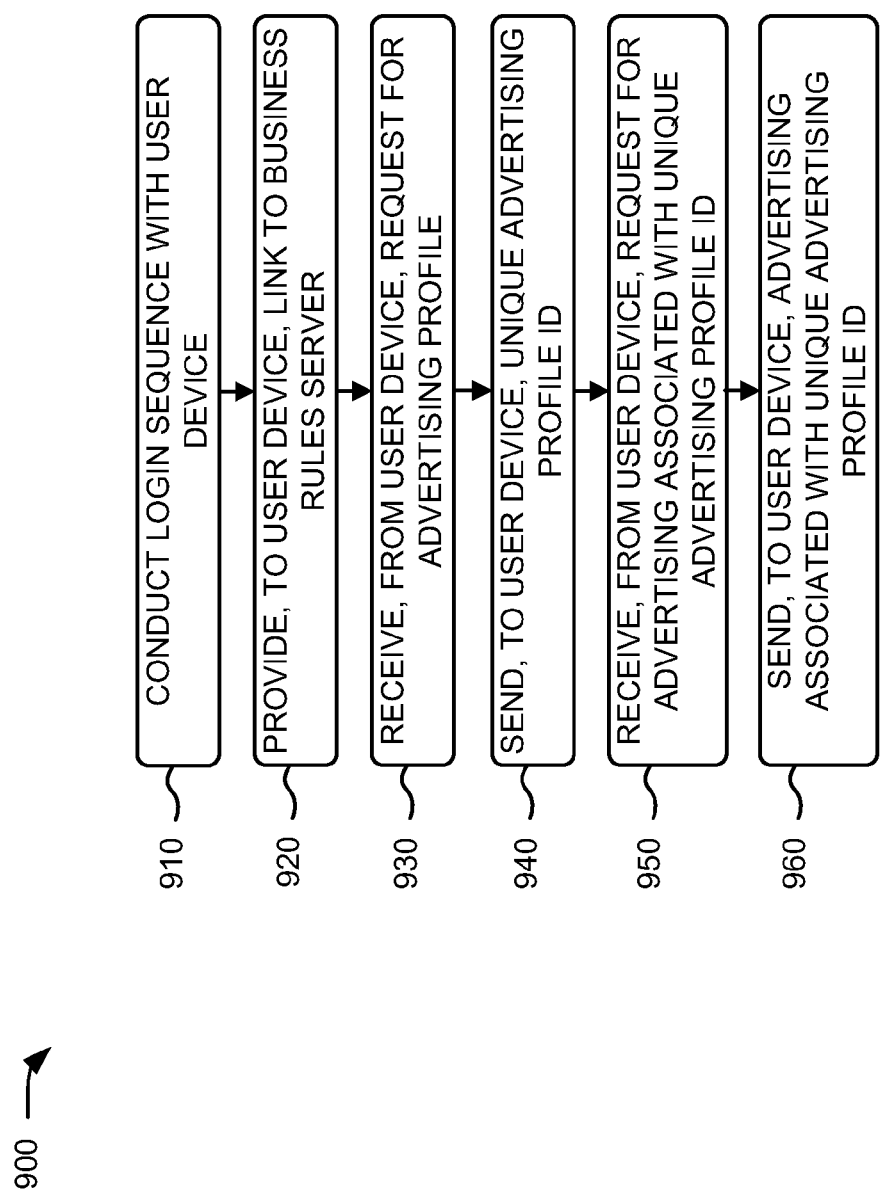
FIG. 9 is a flowchart of an example process for supplying an advertising profile identifier to a user device, according to an implementation described herein.

FIG. 9 is a flowchart of an example process 900 for supplying an advertising profile identifier to a user device, according to an implementation described herein. In one implementation, process 900 may be performed by one or more components of advertising server 150, web server 160, and/or business rules server 170, such as one or more processing units 220. In another implementation, one or more blocks of process 900 may be performed by one or more components of other devices (e.g., one or more of index file server 130, and/or programming server 140), or a group of devices including or excluding advertising server 150, web server 160, and/or business rules server 170.

Process 900 may include conducting a login sequence with a user device (block 910), and providing to the user device a link to a business rules server (block 920). For example, as described above in connection with FIG. 4, a user (not shown) may utilize user device 120 to initiate a connection with web server 160 and initiate a login sequence 410. Web server 160 may receive the user login information, associated with the user, may provide (e.g., using an HTTP/HTTPS connection via network 110) to user device 120 a link to redirect user device 120 to business rules server 170, as indicated by reference number 420.

Process 900 may include receiving, from the user device, a request for an advertising profile (block 930), and sending, to the user device, a unique advertising profile identifier (block 940). For example, as described above in connection with FIG. 4, business rules server 170 may receive profile request 430 and may associate user device 120 (e.g., based on an account or other login information associated with a user) with an advertising profile. Business rules server 170 may provides user device 120 with a unique profile identifier 440 that maps that user device 120 to an advertisement grouping on advertising server 150. In one implementation, unique profile identifier 440 may include a URL for the particular advertisement grouping stored on advertising server 150.

Process 900 may include receiving, from the user device, a request for advertising associated with the unique advertising profile identifier (block 950) and sending, to the user device, advertising associated with the unique advertising profile identifier (block 960). For example, as described above in connection with FIG. 4, based on unique profile identifier 440, user device 120 may establish a connection with advertising server 150 and may download advertisements from the particular advertisement grouping, as indicated by reference number 450.

FIG. 10 is a flowchart of an example process 1000 for supplying an advertising profile identifier to a user device, according to an implementation described herein. In one implementation, process 1000 may be performed by one or more components of advertising user device 120, such as one or more processing units 220. In another implementation, one or more blocks of process 1000 may be performed by one or more components of other devices or a group of devices including or excluding user device 120.

Process 1000 may include conducting a login sequence with a web server (block 1005), and providing, to the web server, a request for particular content (block 1010). For example, a user may utilize user device 120 to initiate a connection with web server 160 and to initiate a login sequence. The login sequence may include, for example, submission, by user device 120 to web server 160, of a user name and/or password (e.g., which may be input by a user of user device 120). User device 120 may view available content that may be streamed to user device 120 and may select particular content available from web server 160.

Process 1000 may include receiving, from the web server, a link to a dynamic index file (block 1015), sending a request, via the link, for the dynamic index file (block 1020), and receiving the dynamic index file with links to chunks of the selected program content and advertising files (block 1025). For example, web server 160 may provide a link, received by user device 120, to redirect user device 120 to a particular index file associated with the user's content selection. The redirect link 320 to the index file may include, for example, a URL to access the particular index files on index file server 130. Using the redirect link, user device 120 may initiate a connection to obtain the index file associated with the user's selected content. User device 120 may provide continuing requests to index file server 130 to retrieve index file entries for the selected content. Each index file entry may include, for example, a URL for a particular chuck of the selected content (e.g., available on programming server 140) and/or an ad-URL to supply an advertising segment within the selected content (e.g., available on advertising server 150).

Process 1000 may include receiving, from the web server, a link to a business rules server (block 1030), sending a request, via the link, for the profile identifier (block 1035), receiving a unique advertising profile identifier (block 1040), and pre-downloading advertising associated with the profile identifier (block 1045). For example, user device 120 may receive, from web server 160, a link to redirect user device 120 to business rules server 170. Using the link to business rules server 170, user device 120 may initiate a connection to business rules server 170 to request an advertising profile. Business rules server 170 may associate user device 120 with an advertising profile and may provide user device 120 with a unique profile identifier that maps that user device 120 to an advertisement grouping on advertising server 150. User device 120 may receive unique profile identifier and may establish a connection with advertising server 150 to download advertisements from the particular advertisement grouping. In one implementation, user device 120 may store the downloaded advertisements for presentation based on ad-URLs included in index files (e.g., index file entries for content selected by the user).

Process 1000 may include, retrieving program content chunks based on the dynamic index file (block 1050), and retrieving advertising content from the pre-downloaded advertising and/or from an advertising server, based on the dynamic file index (block 1055). For example, depending on the type of the file index entry (e.g., a URL for a particular chuck of the selected content or an ad-URL), user device 120 may retrieve a programming content chunk or an advertising file. When the file index entry includes a URL for a particular chuck of the selected content, user device 120 may retrieve a content chunk from programming server 140, as indicated by reference number 340. When the file index entry includes an ad-URL, user device 120 may retrieve an advertisement in accordance with the parameters of the ad-URL.

Systems and/or methods described herein may provide targeted content and/or advertising to a user device. The systems and/or methods may use client side rules with preloading of advertisements combined with server side delivery of live streaming content. Additionally, a server side mechanism provides for a way to "cue" user devices about the start of an advertisement, resulting in the user device retrieving local advertisement files based on business rules that target a certain audience. In another implementation, the systems and/or methods may determine if particular content requested by a user is location-restricted and, if the particular content is location-restricted, may identify a location associated with the user device. The systems and/or methods may direct the user device to an index file for content that based on the geographic location associated with user device. Implementations described herein may allow for a standards based client to be used within a server side implementation. Multiple groupings of index files, based on various location and business criteria, may allow for reduction in media stream creation, and granularity of addressing each subscriber.

The foregoing description provides illustration and description, but is not intended to be exhaustive or to limit the invention to the precise form disclosed. Modifications and variations are possible in light of the above teachings or may be acquired from practice of the invention. For example, while high bandwidth content has been described in the context of HD3D content, in other implementations, other high-bandwidth content may be provided using the systems and methods described herein. Also, while a series of blocks has been described with regard to FIGS. 7-10, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more servers, comprising:

receiving, by one of the servers and from a content source, live video content that includes advertising segments within the live video content;

dividing, by one of the servers, the live video content into chunks, wherein the chunks include separate program content and advertising segments and, wherein an end of one or more of the chunks of the program content corresponds to a beginning of one or more of the chunks of the advertising segments;

assembling, by one of the servers, multiple index files that each define a single linear presentation for the live video content, wherein each of the index files include links to the chunks of the program content and links to advertising content for insertion in place of the chunks of the advertising segments;

receiving, by one of the servers and from a user device, a selection of the live video content;

identifying a location for the user device; and sending, by one of the servers and to the user device, a link to one of the multiple index files based on the location for the user device;

adding to the one of the multiple index files, by one of the servers and after sending the one of the multiple index files, entries for links to additional chunks of the live video content when content corresponding to the live video content continues to be received from the content source.

2. The method of claim 1, where the links to the advertising content include uniform resource locators (URLs) and parameters for advertisements targeted to a user of the user device.

3. The method of claim 1, further comprising:

determining if location-based restrictions apply to the selected live video content;

and selecting the link to the index file based on the location-based restrictions and the location of the user device.

4. The method of claim 3, where the link to the index file includes one or more of:

a link to a blackout notification for user devices within a particular geographic location; or a link to alternate content for the selected live video content.

5. The method of claim 1, where identifying a location for the user device comprises determining a location based on one or more of:

login information of a user, a device identifier, a stored user profile, or a serving base station for a wireless user device.

6. The method of claim 1, further comprising:

receiving, from the user device, a request for a list of content available to a user of the user device; and sending, to the user device, the list of available content, where the list includes one or more titles of live content available for streaming to the user device.

7. The method of claim 1, further comprising:

sending, to the user device, a link to a business rules server;

receiving, from the user device, a request for an advertising profile; and sending, to the user device, an advertising profile identifier, where the advertising profile identifier maps the user device to an advertisement grouping.

8. The method of claim 7, further comprising:

receiving, from the user device, a request for advertising associated with the advertising profile identifier; and sending, to the user device, advertising files based on the advertising profile identifier.

9. The method of claim 1, further comprising:
adding to the index file, after sending the index file, entries for additional links to advertising content for insertion between at least some of the links to the additional chunks.

10. The method of claim 1, further comprising:
assembling, by one of the servers, another index file including links to the chunks of the selected live streaming content and links to different advertising content for insertion in place of the one or more advertising segments.

11. The method of claim 10, wherein the different advertising content is selected based on a profile associated with a user of the user device.

12. The method of claim 1, wherein the links to the advertising content include:
links to particular types of advertising content, or
advertising parameters that may be used by the user device to retrieve the advertising content.

13. The method of claim 1, further comprising:
receiving, by one of the servers and from the user device, a request for the chunks of the program content based on the links to the chunks of the program content in the index file; and
receiving, by a different one of the servers, a request for the advertising content based on the links to the advertising content in the index file.

14. The method of claim 1, wherein dividing the live video content into chunks comprises:
identifying a cue tone for an advertising segment in the live video content,
defining an end to a particular chunk of the program content based on the identified cue tone, and
indicating that a next chunk, after the particular chunk, begins the advertising segment.

15. The method of claim 1, wherein assembling the multiple index files comprises:
receiving an indication that a chunk in the live video content starts the one or more advertising segments,
selecting first advertising parameters for a first advertisement,
inserting, into a first one of the multiple index files and in place of the chunk that starts the one or more advertising segments, the advertising parameters,
selecting second advertising parameters for a second advertisement, and
inserting, into a second one of the multiple index files and in place of the chunk that starts the one or more advertising segments, the second advertising parameters.

16. The method of claim 15, wherein selecting the first or second advertising parameters includes:
selecting a particular advertisement based on instructions from a business rules server, or
selecting criteria for a user device to use to obtain an advertisement from a group of advertisements.

17. A system, comprising:
a web server to:
receive, from a user device, a request for a list of content available to a user of the user device,
send, to the user device, the list of available content, where the list includes one or more titles of live content available for streaming to the user device,
receive, from the user device, a selection of live streaming content, from the list of available content, and
send, to the user device, a link to one of multiple index files that each define a single linear presentation for associated with the selected live streaming content; and
an index server to:
receive, chunks of the selected live streaming content, wherein the chunks include separate program content and advertising segments and, wherein an end of one or more of the chunks of the program content corresponds to a beginning of one or more of the chunks of the advertising segments,
assemble the multiple index files, wherein each of the multiple index files includes a sequence of links to the chunks of the program content and links to advertising content for insertion in place of the chunks of the advertising segments,
receive, from the user device and via the link to the one of the multiple index files, a request for the one of the multiple index files,
send, to the user device, the one of the multiple index files,
add to the one of the multiple index files, after sending the one of the multiple index files, entries for links to additional chunks of the live streaming content when content corresponding to the selection of the live streaming content continues to be received from a content source.

18. The system of claim 17, further comprising:
an advertising server to:
receive, from the user device and based on the one of the multiple index files, a request for an advertising file targeted to a user of the user device, and
send, to the user device, the advertising file.

19. The system of claim 18, further comprising:
a business rules server to:
receive, from the user device, a request for an advertising profile, and
send to the user device, an advertising profile identifier, where the advertising profile identifier maps the user device to an advertisement grouping,
wherein the user device receives a link to the business rules server from the web server.

20. The system of claim 18, where the links to advertising content include uniform resource locators (URLs) and multiple parameters to define content of an advertising file.

* * * * *